United States Patent [19]

Naito et al.

[11] Patent Number: 4,913,657
[45] Date of Patent: Apr. 3, 1990

[54] COUPLING FOR FIRE HOSE WITH BUILT-IN COMMUNICATION CABLE

[75] Inventors: Osamu Naito, Tokyo; Seiji Ozaki, Chiba; Hiromi Mizuguchi, Saitama; Shigesaku Shinozaki, Tochigi; Tohei Kanda, Kanagawa, all of Japan

[73] Assignee: Teikoku Sen-I Co., Ltd., Tokyo, Japan

[21] Appl. No.: 293,295

[22] Filed: Jan. 4, 1989

[30] Foreign Application Priority Data

Apr. 15, 1988 [JP] Japan ................................. 63-93992
Apr. 15, 1988 [JP] Japan .............................. 63-51035[U]

[51] Int. Cl.⁴ .............................................. H01R 4/60
[52] U.S. Cl. ................................... 439/192; 439/194; 439/195
[58] Field of Search ........................ 439/190-195, 439/587, 589, 592, 271-277; 174/47; 138/109, 111

[56] References Cited

U.S. PATENT DOCUMENTS

| 499,254 | 6/1893 | Sargent | 439/192 |
| 1,890,290 | 12/1932 | Hargreaves | 439/194 |
| 3,253,245 | 5/1966 | Brandt | 439/195 |
| 3,518,608 | 6/1970 | Papadopoulos | 439/191 |
| 3,566,002 | 2/1971 | Brown | 138/109 |
| 3,879,097 | 4/1975 | Oertle | 439/195 |
| 4,366,841 | 1/1983 | Currie et al. | 138/109 |
| 4,688,603 | 8/1987 | Donnerhock et al. | 774/47 |

FOREIGN PATENT DOCUMENTS 54-43599 12/1979 Japan.

Primary Examiner—David Pirlot
Attorney, Agent, or Firm—McGlew & Tuttle

[57] ABSTRACT

The present invention relates to a coupling for fire hoses, wherein the fire hose is provided with a built-in communication cable. An inner cylinder is provided which is substantially identical for either the male or female unit. The inner cylinder includes a base end part fitted with a fire hose with a built-in communication cable. An annular sealing material is provided for insulating and water-proofing an opening end face of the inner cylinder, and provided with an annular conductor connected to the communication cable. An outer cylinder is provided which idly engages with an outer peripheral surface of the inner cylinder. A groove part is provided on an inner peripheral surface of the outer cylinder extending to a corresponding one of the opening windows such that when the two outer cylinders are turned with respect to each other, the groove part of one outer cylinder is engaged with the engaging projection of the other outer cylinder, the outer cylinders are brought into contact or separated from one another. When the outer cylinders are brought into contact the annular sealing material on the respective inner cylinders is brought into pressurized contact thereby providing contact between the annular conductor of each of the outer cylinders.

1 Claim, 4 Drawing Sheets

COUPLING FOR FIRE HOSE WITH BUILT-IN COMMUNICATION CABLE

FIELD OF THE INVENTION AND RELATED ART STATEMENT

The present invention relates to a coupling for fire hose with built-in communication cable.

In fire fighting with a fire-fighting vehicle or the like, it is necessary to control the rate of water discharge depending upon the conditions at the scene of the fire. Because of this, what is usually done is to control the pressure of water supplied to the fire hose by adjusting the opening of the throttle valve of the engine or to control the rate of supplied water by opening or closing the discharge valve, based on information on the fire condition given to the personnel on the fire engine by means of radio communication or a liaison fire man.

However, in a fire, it is common that the total number of fire hoses in use amounts to a large number because a plurality of fire hoses are connected to about four discharge ports provided for one fire engine. In particular, it is usual that there are gathered several or ten odd fire engines on the scene of the fire, each of them using fire hoses as described above. Accordingly, due to radio interference or insufficient number of available fighting personnel, it used to be difficult to transmit information that corresponds to the conditions of the fire scene (such information being necessary for adjusting the pressure or flow rate of supplied water), to persons stationed at the fire engine. Further, in the case of controlling the rate of water discharge by exclusively adjusting the rotation speed of the engine while leaving the valves of all of the discharge ports, the flow rate of supplied water from each of the discharge ports is uniform, so that it was not possible to control the rate of supplied water in response to a detailed situation of the fire scene aimed at by hoses connected to each of the discharge ports.

Under these circumstances, there was proposed in the past a coupling structure in which a connecting terminal for a communication cable is arranged on each of the opposing faces of couplings with a built-in communication cable that is connected, by interposing a pressure-sensitive conductor whose resistance in the axial direction alone can be varied by the axial compression of the coupling between the connecting terminals (Japanese Patent Provisional Publication, No. 62-27972 (No. 27972/1987)). Such a hose has an advantage that it can import the conditions of the fire scene by means of a communication cable.

In addition, there was disclosed a device in which a cable is incorporated in the axial direction of a ring-shaped insulating body in place of the pressure-sensitive conductor in the above system (Japanese Utility Model Provisional Publication, No. 63-103087 (No. 103087/1988) and Japanese Utility Model Application, No. 62-50735 (No. 50735/1987)).

However, the pressure-sensitive conductor requires more cost and time for its manufacture, and moreover, the accuracy of change in the resistance obtained falls short of one's expectation. In addition, in the type with built-in cable, it tends to cause defective contact due to bending of the wire caused by the tightening of the coupling.

Further, there used to be a difficulty that such an arrangement leads to a delay in starting the fire fighting activity because of the time it requires for completing the connection of the couplings that have identical shape for both of the male and female parts.

On the other hand, the prior art fire hose is connected to the coupling by inserting an end of the hose to a hose connecting part having saw-tooth engaging peripheral grooves, and binding it with a fastening piece.

However, there was a problem that with such a connection structure it is not sufficient to prevent leakage of water.

In view of this, the present applicants proposed previously a connection for a fire hose which enables secure engaging of a fire hose with a coupling as well as prevention of leakage (Japanese Utility Model Publications, No. 58-28625 (No. 28625/1983) and No. 58-28626 (No. 28626/1983)).

However, when the above-mentioned connective device is applied to the fire hose with built-in communication cable, a new difficulty arose that the communication cable built in the hose was broken as a result of tightening with a tightening piece.

OBJECT AND SUMMARY OF THE INVENTION

The present invention has been contrived to solve the above-mentioned tasks, and, therefore, it is an object of the present invention to provide a coupling for a fire hose with built-in communication cable which facilitates the hose connection work and enables one to obtain a sure electrical connection as well as a water-tight construction.

It is another object of the present invention to provide a coupling for a fire hose with built-in communication cable which has no possibility of breaking the communication cable built in the fire hose, and enables the hose to be surely engaged with the coupling as well as to prevent leakage of water.

The constitution of the present invention for attaining the above objects has the following features (1) and (2).

(1) The coupling consists of an inner cylinder, with identical shape for male and female units, having a hose with built-in communication cable in its base and part, an annular sealing material on the opening face at its tip for the purposes of electrical insulation and waterproofing, and an annular conductor connected to the communication cable; and an outer cylinder idly engaged with the outer periphery of the inner cylinder, having at least one set of an engaging claw part, serving as a male unit, and an opening window, serving as a female unit, on the same face as the opening end of the inner cylinder; whereby the end face of the annular sealing material is formed into an inclined face projecting from the end face of the inner cylinder, from the outer circumferential side toward the inner circumferential side, and a groove part which is linked with the opening window is provided on the inner peripheral surface of the outer cylinder. Here, the groove part on an outer cylinder is formed in such a way that when two outer cylinders are assembled with the engaging claw part the partner outer cylinder is engaged with the groove of the two outer cylinders are turned relatively with each other, the two outer cylinders can be tightened or loosened. By doing so, it becomes possible to bring the sealing materials on the respective inner cylinders into a pressurized contact.

To explain the operation of the above device, two inner cylinders are matched mutually, and the outer cylinders are combined so as to bring the claw part and the opening window coincident with each other. Next, by relatively turning the outer cylinders one against the other, the claw part on one of the outer cylinders moves along the groove part of the partner outer cylinder, bringing the respective inner cylinders into pressurized contact. In this manner, annular conductors are provided on the respective end faces of the inner cylinders which are mutually pressure contacted, establishing an electrical connection.

(2) An end of a fire hose with built-in communication cable having a cable disposed between a jacket part and a lining layer, is inserted between a hose connecting part with a sharp tip engaging part and an arcuate tip engaging part of a coupling and a tightening piece, with a hose protective cushion on the side of the tightening piece. The communication cable is led out of the jacket part from the area corresponding at least to the sharp tip engaging part of the hose end, disposing the cable between the hose protective cushion and the jacket part, and the end part of the hose is tightening at the hose connecting part using the tightening piece.

For the jacket part of the hose to be used in the present invention, use may be made, for example, of a piece of fabric or knitting made by using cotton yarn or synthetic fiber (for example, polyester) as weft and warp.

For the lining layer, use is made usually of natural rubber or synthetic rubber.

As the connection structure for the present invention, there are two types. Namely, a first is the type in which an end part of a fire hose is inserted to the outside of the hose connecting part of the coupling, and tightened with a metallic ring as a tightening piece, and a second is the type in which an end part of the fire hose is inserted to the hose connecting part of the coupling, and tightening them by expanding the expansion ring from the inside by the use of an expansion ring as a tightening piece.

In the hose connecting part of the coupling, there are formed a sharp tip engaging part and an arcuate tip engaging part.

The sharp tip engaging part is a part for securely fixing the hose against the action of the water pressure, so as not to come off the coupling. When the sharp tip of the sharp tip engaging part is tightened with a tightening piece, it bites the lining layer of the hose so that the hose will not come off even when a high water pressure is applied to it. The arcuate tip engaging part is the part for preventing leakage of water when the end part of the fire hose is tightened to the hose connecting part.

Namely, the sharp tip of the sharp tip engaging part prevents the falling of the hose by biting the lining layer of the hose. However, in so doing, there is a possibility of injuring the lining layer by the sharp tip which may lead to a leakage of water from the opening of the wound. Even if the lining layer is damaged by the sharp tip, there is no possibility of damaging the end part of the hose by the arcuate part of the arcuate tip engaging part, so that there will occur no water leakage.

As in the above, the lining layer of the hose may be damaged by the sharp tip of the sharp tip engaging part. If the communication cable is disposed between the jacket part and the lining layer, in this case, there is a possibility of the sharp tip damaging the cable which might result in a breaking of the wires. Therefore, in the present invention, the communication cable is disposed between the hose protective cushion and the jacket part, at least for the part corresponding to the sharp tip engaging part, or over the entire area corresponding to the hose connecting part, in order to increase the certainty, of the fire hose.

Next, the effect of the present invention will be described.

As described in the above, according to the coupling for fire hose with built-in communication cable of the present invention (1), partner couplings are of the same shape, each having both of the male and female units. Therefore, the work for connecting the couplings requires no need for taking the sense of each of the couplings into account, so that the operability can be enhanced.

Furthermore, according to the present invention (2), there is no possibility of having breakage of the communication cables, and it becomes possible to securely engage a hose with built-in communication cable to this coupling and at the same time to prevent the leakage of water.

BRIEF DESCRIPTION OF THE DRAWINGS

FIGS. 1(A) and 1(B) through FIG. 3 show the coupling for fire hose with built-in communication cable in accordance with the first embodiment of the present invention, wherein FIG. 1(A) and FIG. 2 show longitudinal sectional diagrams, FIG. 1(B) shows a right elevation of FIG. 1(A), and FIG. 3 is a perspective view of FIG. 2.

DETAILED DESCRIPTION OF PREFERRED EMBODIMENTS

[First Embodiment]

Figure 1A:
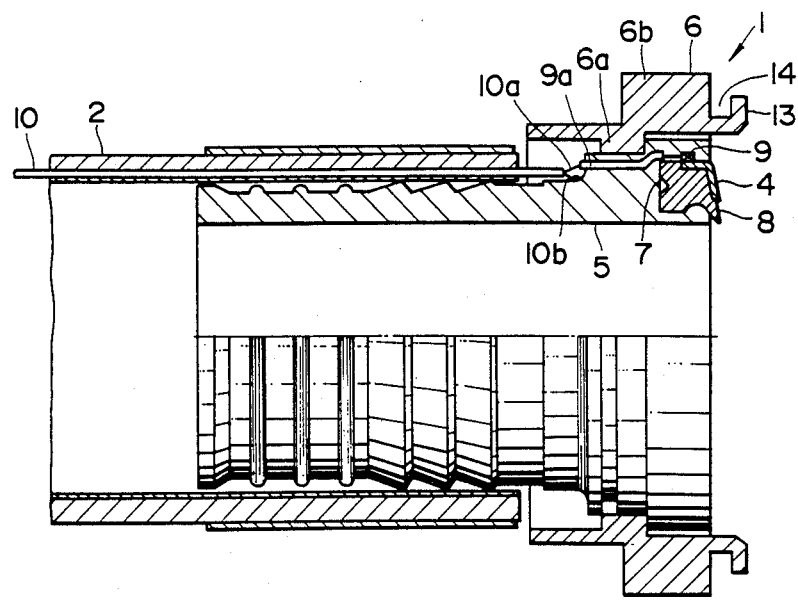
Figure 1B:
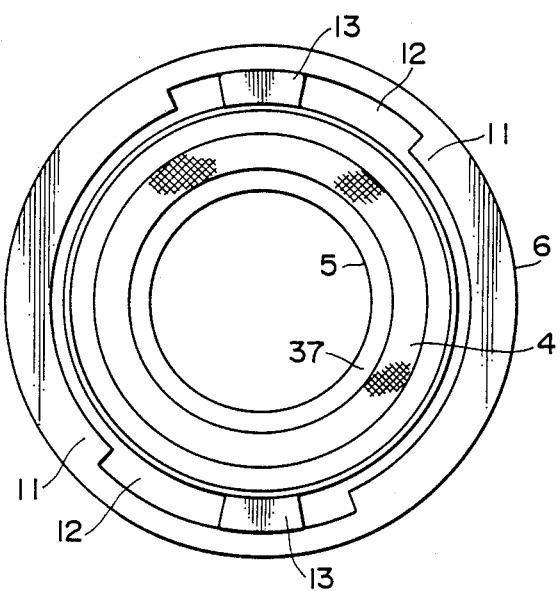
Figure 2:
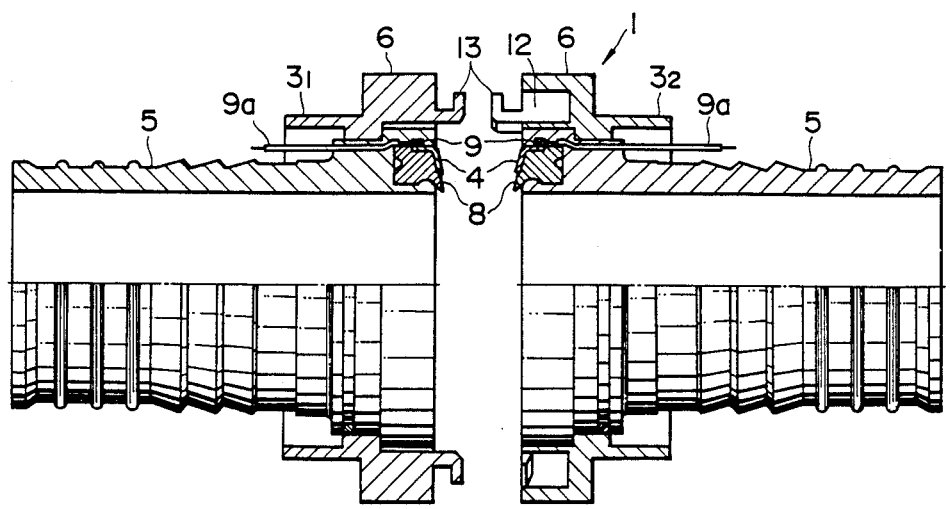
Figure 3:
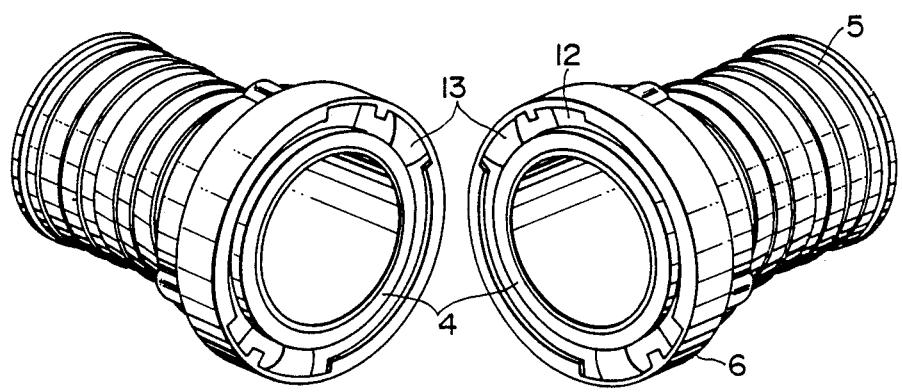
Figure 4:
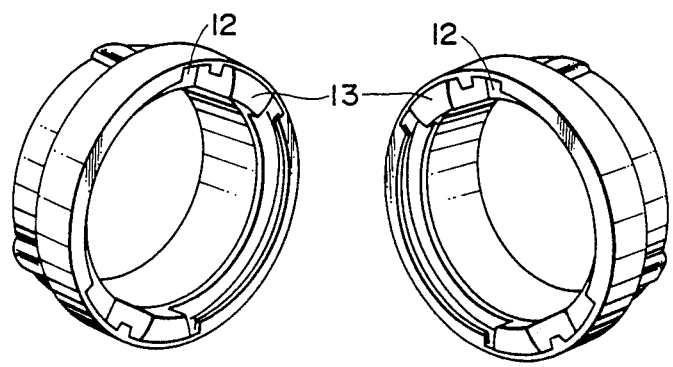
FIG. 4 is a perspective view showing the outer cylinder of FIG. 3.

Referring to the drawings, the first embodiment of the present invention will now be described in detail.

In FIGS. 1(A) and 1(B) to FIG. 4, 1 is a coupling which links two fire hoses with built-in communication cable, where the male and female units are constructed by coupling fittings $3_1$ and $3_2$.

Each of the metal fittings $3_1$ and $3_2$ consists of an inner cylinder 5 in which an annular conductor 4 is provided on the opening end face on its one end and a hose with built-in communication cable is arranged, and an outer cylinder 6 engaged with the inner cylinder 5 and has a connection part.

The inner cylinder 5 has a recessed groove 7 formed along the circumferential direction on its opening end face, with an annular sealing member 8 inserted within the recessed groove 7. The sealing member 8 is so formed as to project its inner diameter side toward the axis of the hose with respect to the outer diameter side, with the inner diameter side protruding from the end face of the inner cylinder.

On the outer circumferential side of the sealing member 8 there is fitted integrally an annular electrical conductor 4 with one of its peripheries bent along the end face on the outer diameter side of the sealing member 8.

Figure 5:
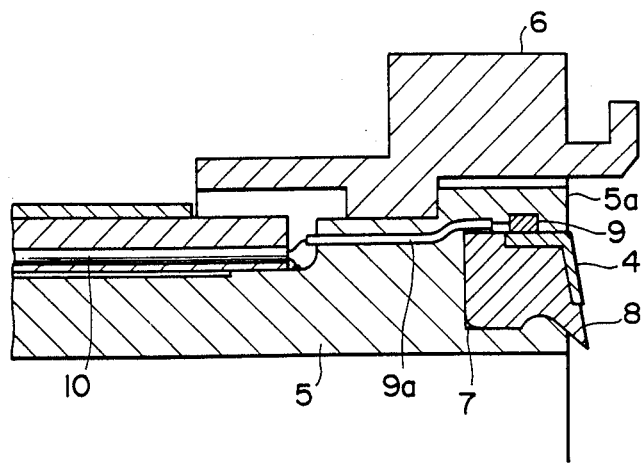
FIG. 5 is an enlarged sectional diagram of a part of FIG. 1.

The annular conductor 4 is made, in this case, of a metallic wire mesh with the mesh so arranged as to intersect obliquely the axial direction of the inner cylinder 5 in order to permit its elongation or contraction in the axial direction. Here, after the wire mesh is wound in a cylindrical form, the inner peripheral side and the outer peripheral side are surrounded by a sealing member. On the inner surface of the recessed groove 7 a sliding conductor 9 that makes contact with the annular conductor 4 is provided as shown in FIG. 5, and the sliding conductor 9 is connected to a lead line 9a which is provided penetrating through a flange part 5a of the inner cylinder 5. The lead line 9a is connected to the positive side 10a of a cable 10 of the hose 2 with built-in communication cable fitted on the outer peripheral surface of the inner cylinder 5. The negative side 10b of the cable 10 is connected to the inner cylinder 5 by means of soldering or the like.

On the other hand, the outer cylinder 6 is fitted freely detachably to the inner cylinder 5, and is locked to the flange part 5a of the inner cylinder 5 to prevent it from dropping-off. The outer cylinder 6 consists of a small diameter part 6a which engages with the inner cylinder 5, and a large diameter part 6b which is provided with a pair of flanges 11 extending toward the cylindrical axis in a symmetrical manner, opening parts 12 formed with a predetermined spacing between the flanges 11, and a pair of engaging projections 13.

The flange 11 is formed projecting for a predetermined length along the periphery from the inner peripheral face of the opening end of the large diameter part 6b. It is formed so as to increase the thickness gradually for a predetermined length from the opening part 12 along the circumferential direction of the outer cylinder. The engaging projection 13 is formed on the end face of the inner cylinder 5, projecting for a predetermined width toward the axial direction, and on its outer surface side there is formed a recessed part 14 that engages with the flange 11.

Figure 6A:
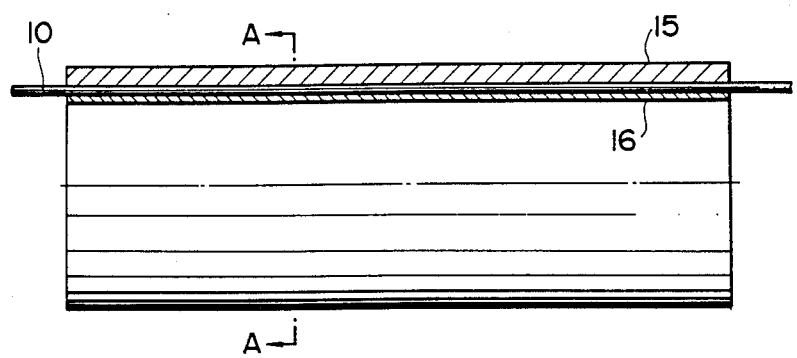
FIG. 6(A) is a longitudinal sectional diagram of the hose with built-in communication cable.
Figure 6B:
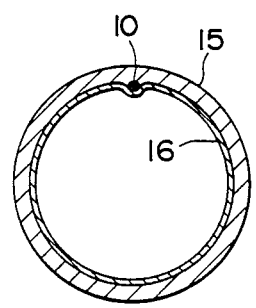
FIG. 6(B) is a sectional diagram as taken in the plane of the line A—A of FIG. 6(A)
Figure 7:
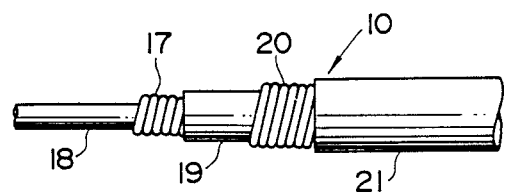
FIG. 7 is a conceptual diagram for the cable.

The hoes 2 with built-in communication cable as described in the above is formed by pasting a resin or rubber lining tube on the inner surface of the hose jacket as shown in FIGS. 6(A) and 6(B), with a cable 10 being disposed between the hose jacket 15 and the lining tube 16. The cable 10 is made, for example, by winding a copper wire 17 helically around a polyester resin core line 18, giving a coating 19 of polyvinyl chloride material, and further, winding a cooper wire 20 helically over the coating 19, and giving a polyvinyl chloride coating 21 to form a coaxial cable, as shown in FIG. 7. The cable 10 is designed not to be broken even when it is elongated more (20%) than the elongation expected of the water pressure on the hose. It should be noted that use may also be made of a parallel biaxial type cable instead of the cable 10.

Now, assembling of couplings with the above-mentioned constitution will be described in what follows.

The coupling fittings $3_1$ and $3_2$ assembled by matching the engaging projection 13 of one $3_1$ of the coupling fittings with the opening part 12 of the other coupling fittings $3_2$, and matching the engaging projection 13 of the other coupling fitting $3_2$ with the opening part 12 of one of the coupling fitting $3_1$.

When the outer cylinders 6 of the coupling fittings $3_1$ and $3_2$ in this state are turned relatively in the mutually opposing directions, assemblage is completed with the engagement of the engaging projections 13 with the respective flanges 11. With the above motion, the inner cylinders 5 and the outer cylinders 6 are brought closer to each other as the coupling fittings $3_1$ and $3_2$ are turned since the thickness of the flanges 11 of the engaging projections 13 is increased gradually along the circumferential direction of the outer cylinder. In this way, both sealing members 8 are mutually pressure contacted, bringing both annular conductors 4 into contact and establishing an electrical connection between the cables 10 of hoses 2 with built-in communication cable.

Referring to the drawings, the second embodiment of the present invention will be described in detail in the following.

Figure 8:
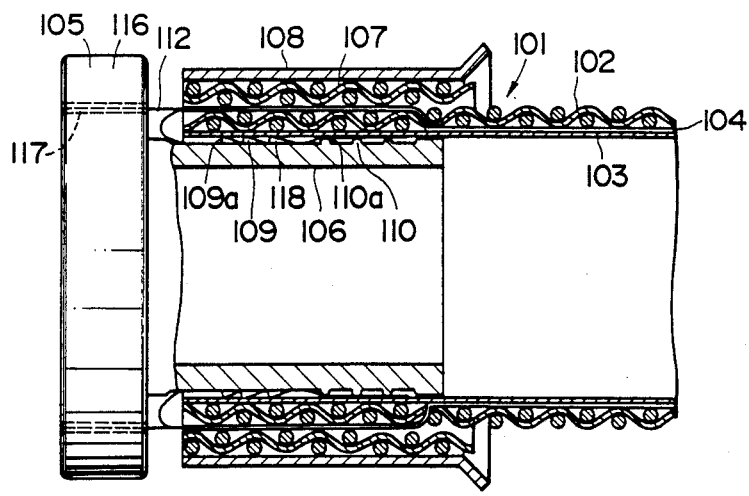
FIG. 8 is a sectional diagram of the coupling for fire hose with built-in communication cable showing a second embodiment of the present invention.

In FIG. 8, 101 is a fire hose with built-in communication cable in which the communication cable 104 is disposed between a jacket part 102 woven by combining weft and warp and a lining rubber layer 103 along the longitudinal direction of the hose. The end part of the hose 101 is inserted to a hose connecting part 106 of the coupling 105. Over the hose 101 there is fitted a hose protective cushion 107 made, for example, by weaving polyester resin fiber, and the whole thing is fixed by binding it with a metallic ring 108 from above.

Figure 9:
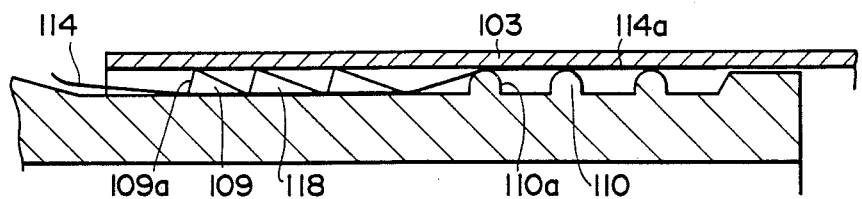
FIG. 9 is a partially enlarged sectional diagram showing an enlargement of a part of FIG. 8.
Figure 10:
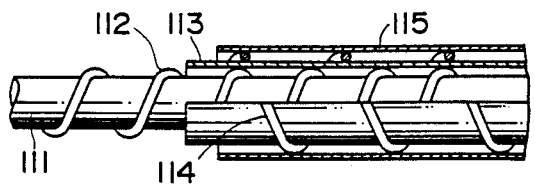
FIG. 10 is a partial sectional diagram for a communication cable used in this embodiment.

As shown in FIG. 8 and FIG. 9, in the hose connecting part 106 of the coupling 105 there are formed a sharp tip engaging part 109 having a sharp tip 109a and an arcuate tip engaging part 110 having an arcuate part 110a.

The communication cable 104 is led out, in the area corresponding to the hose connecting part 106, to the surface of the jacket part 102 from between the jacket part 102 and a lining rubber layer 103, and is disposed between a hose protective cushion 107 and the jacket part 102.

The cable 104 is formed, for example, by winding helically a positive-side electrical wire 112 on the outer periphery of a core thread 111 made of urethane resin, forming an insulating layer 113 on the outer periphery of the wire, further winding helically a negative-side electrical wire 114 on the outer periphery in the direction opposite to that of the wire 112, and arranging the outcome within a urethane resin tube 115.

On the outer periphery of the hose 101 there is fitted a metallic ring 108, and the end part of the 101 is fixed by tightening to the hose connecting part 106 with the ring 108.

In a flange part 116 of the coupling 105 there is provided a cable threading hole 117 through which is led the positive-side wire 112 to the opposite side of the flange part 116, and the wire 112 is brought into contact with a wire arranged in a partner coupling, to establish an electrical conduction.

The tip of the negative-side wire 114 is fixed to a share tip engaging part 109 and an arcuate tip engaging part 110 of the hose connecting part 106 by means of soldering or the like. As shown in FIG. 9, a groove 118 is formed in the sharp tip engaging part 109 in the direction parallel to the axis of the coupling 105, the tip part of the wire 114 is embedded in the groove 118, and the end part 114a of the wire 114 is held pinched between the tip 110a of the arcuate tip engaging part 110 and the lining rubber layer 103 of the hose.

By arranging the wires 112 and 114 in this way it is possible to secure electrical conduction between the mutual communication cables 104 when a coupling 105 is connected with a partner coupling.

In the connection structure of the above embodiment, the tip of the negative-side wire 114 of the communication cable 104 is connected directly to the hose connecting part. However, by attaching a metallic thin plate or a wire mesh on the tip of the wire 114 and bringing the metallic thin plate or the wire mesh into contact with the hose connecting part, it is possible to secure electrical conduction and to obtain a structure which is free from breakage. In this case, there is obtained an advantage that it is not necessary to form the groove 118 in the sharp tip engaging part 109.

On the other hand, as the communication cable, various types of cables such as that of coaxial type or biaxial type may also be made use of.

Figure 11:
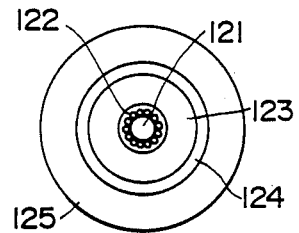
FIG. 11 is a conceptual diagram for the coaxial type communication cable.

As an example of the coaxial type communication cable, there is one in which a conductor 122 is wound around a core material 121 made of nylon, covering its outer periphery with an insulating layer 123, further winding a conductor 124 around the outer periphery of the product, and arranging the whole thing within a tube 125 made of polyvinyl chloride, as shown in FIG. 11.

Figure 13:
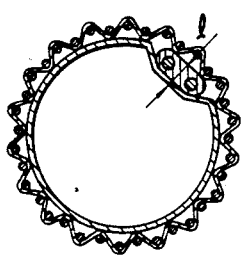
FIG. 13 is a schematic sectional diagram for the fire hose with built-in communication of biaxial type.
Figure 12:
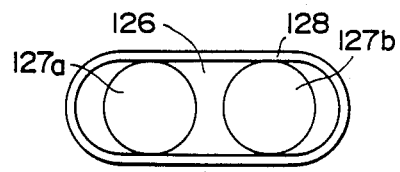
FIG. 12 is a conceptual diagram for the biaxial type communication cable.

As an example of the biaxial type communication cable, one may mention one in which two conductors 127a and 127b covered with a polyurethane insulating material 126 is arranged in a tube 128 made of polyvinyl chloride, as shown in FIG. 12. The biaxial type cable is of elongated circular form or elliptic form so that the width l shown in FIG. 13 is smaller for the case of arranging the communication cable within the fire hose compared with the case of disposing a biaxial type communication cable. Accordingly, damages to the hose due to friction or the like at the time of being treaded upon in storing or feeding the hose, can be reduced.

In the connection structure for the coupling of the present invention, use can be made of a hose which has a built-in communication cable, so that it is possible in the fire fighting activity to communicate through wire between a fire engine and the tip of the hose.

Moreover, the communication cable is led out to the surface of the jacket part of the hose, at least in the area corresponding to the sharp tip engaging part on the tip of the fire hose, and the cable is held between the hose protective cushion and the jacket part, so that the cushion and the jacket part serve as cushioning materials against the pressurizing force of the tightening piece. For this reason, even when the communication cable is tightened with a large force from the tightening piece and the sharp tip engaging part of the coupling, the communication cable will not be broken.

Therefore, according to the connection structure between the fire hose with built-in communication cable and the clamping of the present invention, there is no possibility of having breakage of the communication cable, and it is possible to securely engage the fire hose with the coupling and to prevent water leakage.

We claim:

1. A coupling for a fire hose with built-in communication cable, comprising:
    an inner cylinder, substantially identical in shape for male and female units, having a base end part fitted with a fire hose with built-in communication cable, annular sealing material for insulating and waterproofing an opening end face tip of said inner cylinder, and provided with an annular conductor connected to the communication cable;
    an outer cylinder idly engaged with an outer peripheral surface of the inner cylinder, said outer cylinder having an outer cylinder opening end surface corresponding to the opening end of the inner cylinder, along its circumferential direction, at least a pair of engaging projections being provided on said outer cylinder opening end as a male unit and opening windows as a female unit;
    the end face of said annular sealing material being formed as an inclined surface that protrudes out of the inner cylinder end face in the direction from an outer side of the inner cylinder toward an inner side of the inner cylinder, and a groove part provided on an inner peripheral surface of said outer cylinder extending to a corresponding one of said opening windows such that when two outer cylinders are turned with respect to each other by being assembled so as to cause the groove part of one outer cylinder to be engaged with the engaging projections of the other outer cylinder, the outer cylinders can be brought into contact or separated from one another, thereby making it possible to bring the annular sealing materials on the respective inner cylinders into pressurized contact.

* * * * *